US006424673B1

(12) United States Patent
Chen et al.

(10) Patent No.: US 6,424,673 B1
(45) Date of Patent: Jul. 23, 2002

(54) METHOD AND APPARATUS IN A WIRELESS COMMUNICATION SYSTEM FOR FACILITATING DETECTION OF, AND SYNCHRONIZATION WITH, A PREDETERMINED SYNCHRONIZATION SIGNAL

(75) Inventors: Weizhong Chen, Keller; Leo Dehner, Southlake, both of TX (US)

(73) Assignee: Motorola, Inc., Schaumburg, IL (US)

( * ) Notice: Subject to any disclaimer, the term of this patent is extended or adjusted under 35 U.S.C. 154(b) by 39 days.

(21) Appl. No.: 09/709,690

(22) Filed: Nov. 10, 2000

(51) Int. Cl.[7] ................................................. H04L 7/00
(52) U.S. Cl. ........................ 375/149; 375/364; 370/337
(58) Field of Search ................................. 370/322, 344, 370/335, 337, 350, 342, 365, 514, 515, 503, 529, 509, 520, 512, 204, 252, 253; 375/364, 368, 149, 343, 150, 142, 367, 130, 148, 143, 152, 357

(56) References Cited

U.S. PATENT DOCUMENTS 5,177,740 A * 1/1993 Toy et al. .................... 370/337
5,590,160 A * 12/1996 Ostman ....................... 375/149
5,982,763 A * 11/1999 Sato ............................ 370/335
6,226,336 B1 * 5/2001 Atarius et al. .............. 375/364

* cited by examiner

Primary Examiner—Huy D. Vu
Assistant Examiner—Phuongchau Ba Nguyen
(74) Attorney, Agent, or Firm—R. Louis Breeden (57) ABSTRACT

A processor (306) is assigned a predetermined synchronization signal for use in communicating in a wireless communication system (100) The processor calculates (402) a total energy of the predetermined synchronization signal. A receiver front end (302) coupled to the processor receives (404) a signal which may include the predetermined synchronization signal, and calculates (406) a plurality of cross-correlation values between the received signal and the predetermined synchronization signal to locate a correlation peak. The processor also calculates (408) a plurality of detection metrics as a function of the plurality of cross-correlation values, the received signal, and the predetermined synchronization signal. In addition, the processor calculates (410) a corresponding plurality of adaptive thresholds as a function of the total energy and the received signal, and compares (412) the plurality of detection metrics with the plurality of adaptive thresholds to determine whether the received signal includes the predetermined synchronization signal.

21 Claims, 5 Drawing Sheets

METHOD AND APPARATUS IN A WIRELESS COMMUNICATION SYSTEM FOR FACILITATING DETECTION OF, AND SYNCHRONIZATION WITH, A PREDETERMINED SYNCHRONIZATION SIGNAL

FIELD OF THE INVENTION

This invention relates in general to wireless communication systems, and more specifically to a method and apparatus in a wireless communication system for facilitating detection of, and synchronization with, a predetermined synchronization signal selected from a plurality of different synchronization signals.

BACKGROUND OF THE INVENTION

Prior art digital wireless communication systems have utilized fixed synchronization codes for synchronizing receiver timing with that of a received signal. Such synchronization codes have been transmitted either at predetermined intervals or following a preamble. Because a fixed synchronization code does not change from transmission to transmission, the transmitted energy of the synchronization code does not change. Thus, the synchronization code can be detected by simply locating a cross-correlation peak between the fixed synchronization code and the received signal.

Some recently proposed systems, such as Bluetooth, utilize non-fixed synchronization codes. The non-fixed synchronization codes, also referred to as access codes, combine addressing and synchronization in a single, longer code. An access code is assigned on a temporary basis to a receiver. These codes vary significantly in energy from one synchronization code to another, thus making it difficult to reliably detect a wanted synchronization signal while avoiding a false detection on an unwanted synchronization code, or a false detection on pure noise.

Thus, what is needed is a method and apparatus in a wireless communication system for facilitating detection of, and synchronization with, a predetermined synchronization signal selected from a plurality of different synchronization signals. Preferably, the method and apparatus will operate reliably with synchronization signals having a wide range of energy levels and will not false on noise or on unwanted synchronization codes.

DETAILED DESCRIPTION OF THE DRAWINGS

Figure 1:
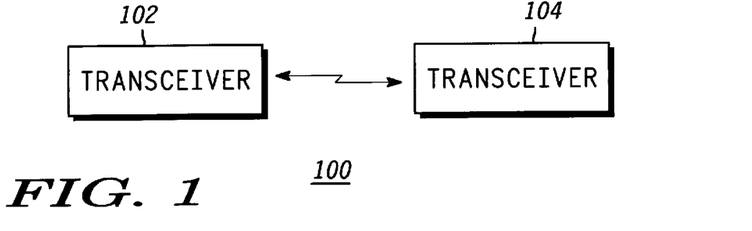
FIG. 1 is an exemplary electrical block diagram of a wireless communication system in accordance with the present invention.

Referring to FIG. 1, an exemplary electrical block diagram of a wireless communication system 100 in accordance with the present invention comprises a first transceiver 102 and a second transceiver 104. The first and second transceivers 102, 104 preferably communicate wirelessly with one another to form an ad hoc network. Preferably, one of the transceivers, e.g., the first transceiver 102, is a "master" and controls the ad hoc network, while the other transceiver, e.g., the second transceiver 104, is a "slave." It will be appreciated that one or more additional slave transceivers can join the ad hoc network. The ad hoc network preferably operates in accordance with the well-known Bluetooth specification. It will be appreciated that, alternatively, other similar wireless communication system specifications can be used as well.

Figure 2:
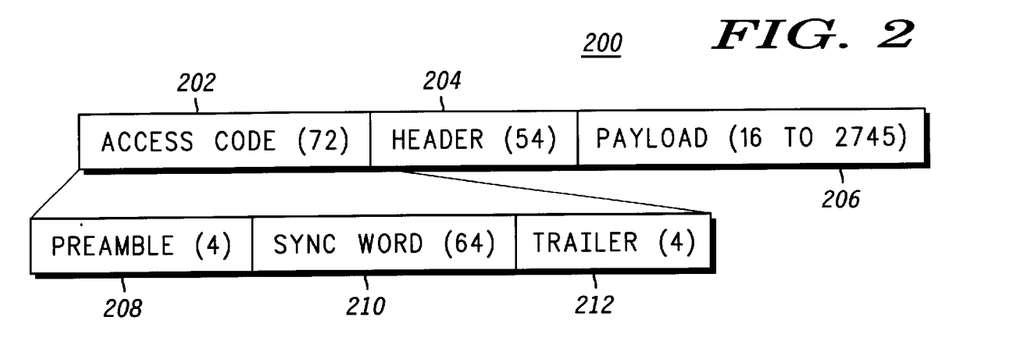
FIG. 2 is a timing diagram of an exemplary communication protocol which utilizes an access code in accordance with the present invention.

FIG. 2 is a timing diagram 200 of an exemplary communication protocol which utilizes an access code 202 in accordance with the present invention. The diagram 200 comprises the access code 202, a header 204, and a payload 206. Preferably, the access code is 72 bits in length, the header is 54 bits, and the payload is 16 to 2745 bits. Preferably, the access code 202 includes a 4-bit preamble 208, a 64-bit synchronization word 210, and a 4-bit trailer 212. It will be appreciated that, alternatively, other lengths and structures of access code can be utilized instead.

The access code 202 is utilized by the intended transceiver 104 as a synchronization signal to derive arrival timing and carrier offset of the received signal. The access code can change from packet to packet, and only the intended transceiver 104 knows the access code precisely. The transceiver is informed of which access code (predetermined synchronization signal) to communicate with by the system, i.e., by the master transceiver 102, before the message transmission. Non-intended transceivers will switch to a sleeping mode after the access code until it is time for a next transmission time slot.

In order to receive a message, the transceiver 104 must first determine whether the message is intended for the transceiver 104. This is accomplished by determining whether a predetermined access code assigned to the transceiver 104 is present. The transceiver 104 should not falsely detect the predetermined access code on noise during empty time slots. When the predetermined access code is present, the transceiver 104 also must derive the packet timing and carrier error so that the packet can be decoded.

Reliable access code detection presents several challenges. First, the fact that the access code is not fixed from packet to packet means that the access codes vary significantly in energy from one access code to another. Bluetooth, for example, can have up to 2^24 different access codes. A received unwanted synchronization signal energy could be much larger than that of a received wanted synchronization signal. Prior to a valid (wanted or unwanted) synchronization signal, the pure noise power can be much stronger than the valid signal. This makes it difficult to avoid a false detection during the transition from noise to synchronization signal and from synchronization signal to noise as well. How these challenges are overcome in accordance with the present invention will be explained further herein below.

Figure 3:
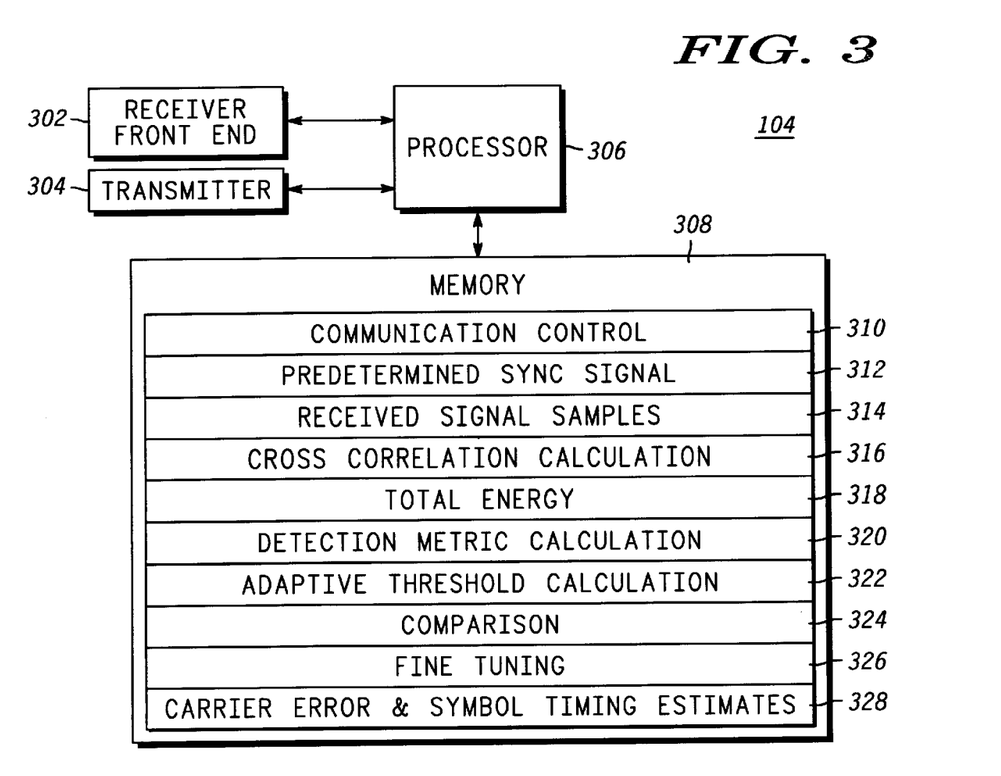
FIG. 3 is an electrical block diagram of an exemplary transceiver in accordance with the present invention.

FIG. 3 is an exemplary electrical block diagram of the transceiver 104 in accordance with the present invention.

For the purposes of this disclosure, the transceiver 104 is defined to be operating as a slave transceiver. The transceiver 104 comprises a conventional receiver front end 302 for receiving and demodulating a signal which may include the predetermined synchronization signal (access code). The transceiver 104 further comprises a conventional transmitter 304 for sending a communication to another transceiver, such as the master transceiver 102. The transceiver 104 also includes a conventional digital signal processor (DSP) 306 coupled to the receiver front end 302 for processing the received signal and coupled to the transmitter 304 for controlling the transmitter 304. The processor 306 is coupled to a conventional memory 308 including variables and software elements for programming the processor 306 in accordance with the present invention. It will be appreciated that, alternatively, the memory 308 can be included within the processor 306 as an integral portion of the processor 306. It will be further appreciated that the functionality of the processor 306 and the memory 308 can be realized in an Application-Specific Integrated Circuit (ASIC) when lowest power consumption is required.

The memory 308 comprises a communication control program 310 for programming the processor 306 to control the transmitter 304 and the receiver front end 302 to communicate with other transceivers 102 in the wireless communication system 100 in accordance with a well-known communication protocol, e.g., the Bluetooth protocol. The memory 308 further comprises space for storing the predetermined synchronization signal 312 assigned to the transceiver 104 by the wireless communication system 100. The memory 308 also includes space for storing a plurality of received signal samples 314, the space preferably sufficient to accommodate the synchronization word 210. In addition, the memory 308 includes a cross-correlation calculation program 316 for programming the processor 306 to calculate a plurality of cross-correlation values between the received signal and the predetermined synchronization signal 312 to locate a correlation peak. The memory 308 further comprises a total energy program 318 for programming the processor 306 to calculate and store a total energy of the predetermined synchronization signal 312. The memory 308 also includes a detection metric calculation program 320 for programming the processor 306 to calculate a plurality of detection metrics as a function of the cross-correlation values, the received signal, and the predetermined synchronization signal. In addition, the memory 308 includes an adaptive threshold calculation program 322 for programming the processor 306 to calculate a corresponding plurality of adaptive thresholds as a function of the total energy and the received signal. The memory 308 further comprises a comparison program 324 for programming the processor 306 to compare the plurality of detection metrics with the plurality of adaptive thresholds to determine whether the received signal includes the predetermined synchronization signal. The memory 308 also includes a fine tuning program 326 for programming the processor 306 to locate a peak non-squared detection metric that is greater than non-squared detection metrics one sample index earlier and later, and to compute a fine tuned correlation peak for symbol timing from the peak non-squared detection metric and the non-squared detection metrics one sample index earlier and later. In addition, the memory 308 includes a carrier error and symbol timing estimation program 328 for programming the processor 306 to determine a final carrier error estimate from the fine tuned correlation peak, and further to derive the symbol timing from the fine tuned correlation peak. Operation of the transceiver 104 in accordance with the present invention will be described in further detail herein below.

Figure 4:
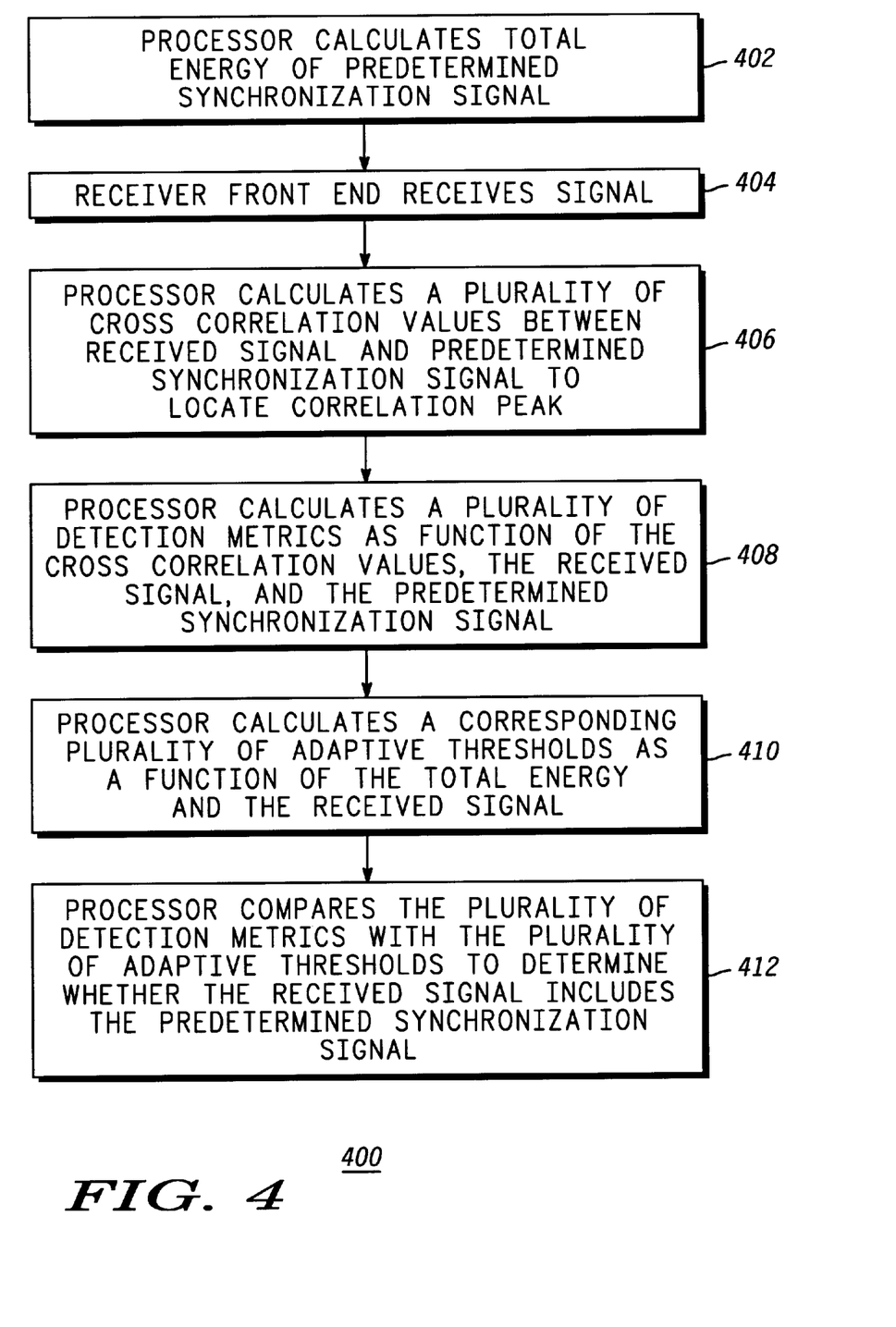
FIG. 4 is a flow diagram depicting an exemplary operation of the wireless communication system in accordance with the present invention.

FIG. 4 is a flow diagram 400 depicting an exemplary operation of the wireless communication system in accordance with the present invention. The processor 306 calculates 402 (off line) and stores the total energy of the predetermined synchronization signal 312. The receiver front end 302 then receives 404 a signal. As the signal is being received, the processor 306 calculates 406 a plurality of cross-correlation values between the received signal and a predetermined synchronization signal (access code) to locate a correlation peak. (The predetermined synchronization signal was selected by the master transceiver 102 from a plurality of different synchronization signals and communicated to the slave transceiver 104, using a predetermined initial access code.) The processor 306 then calculates 408 a plurality of detection metrics as a function of the plurality of cross-correlation values, the received signal, and the predetermined synchronization signal.

To calculate the plurality of detection metrics, the processor 306 calculates from the received signal a corresponding plurality of carrier error estimates. The processor 306 also calculates (off line) a sum of samples of the predetermined synchronization signal, and multiplies the plurality of carrier error estimates by the sum to produce a plurality of adjustment values. The processor 306 adjusts the plurality of cross-correlation values by the plurality of adjustment values, thereby producing a plurality of non-squared detection metrics. The processor 306 squares the plurality of non-squared detection metrics to generate the plurality of detection metrics used for detecting the presence of the predetermined synchronization signal in the received signal.

In addition, the processor 306 calculates 410 a corresponding plurality of adaptive thresholds as a function of the received signal and the total energy. This is preferably accomplished by calculating a plurality of variances of the received signal, and multiplying the plurality of variances by the total energy of the predetermined synchronization signal and by a threshold constant. The processor 306 compares 412 the plurality of detection metrics with the plurality of adaptive thresholds to determine whether the received signal includes the predetermined synchronization signal. This is preferably accomplished by comparing a detection metric of the plurality of detection metrics with a corresponding adaptive threshold of the plurality of adaptive thresholds to determine whether the detection metric is greater than the corresponding adaptive threshold; and, when the detection metric is greater than the corresponding adaptive threshold, determining that the received signal includes the predetermined synchronization signal. In addition, when the detection metric is greater than the corresponding adaptive threshold, the processor 306 locates a peak non-squared detection metric that is greater than non-squared detection metrics one sample index earlier and later than the sample index of the peak non-squared detection metric.

In response to locating the peak non-squared detection metric, the processor 306 determines a location of a fine tuned correlation peak from the peak non-squared detection metric and the non-squared detection metrics one sample index earlier and later. This is preferably accomplished by a fitting a second-order polynomial to the peak non-squared detection metric and the non-squared detection metrics one sample index earlier and later than the sample index of the peak non-squared detection metric through well-known techniques, and then locating the peak mathematically. Once the location of the fine tuned correlation peak is known, the processor 306 then determines a final carrier error estimate from the location of the fine tuned correlation peak. This is preferably accomplished by linear interpolation of the carrier error estimates calculated for the sample indexes immediately before and after the location of the fine tuned correlation peak. The symbol timing is also derived from the location of the correlation peak, i.e., the location of the correlation peak represents the center of the received symbols.

The process of detecting and synchronizing with the predetermined synchronization signal will now be described mathematically. In one form, the detection metric is calculated as $$M(n) = \frac{[R_{SX}(n-N+1) - \hat{f}_C(n)S_S]^2}{E_S V_X(n)} \quad (1)$$

where N is the length of the synchronization signal s(m), and n is the current sample.

The cross-correlation of the received signal and the predetermined synchronization signal $$R_{SX}(n) = \sum_m x(n+m)s(m)$$

is calculated on line, where x(n) is the received signal.

The sum of the predetermined synchronization signal (calculated off line) is $$S_S = \sum_m s(m)$$

The on-line estimate of the carrier error is $$\hat{f}_C(n) = \frac{\sum_{m=0}^{N_w-1} w(m)[x(n-m) - s(N-m)]}{\sum_{m=0}^{N_w-1} w(m)}$$

$$= \frac{\sum_{m=0}^{N_w-1} w(m)x(n-m) - S_S(w)}{S_W}$$

where w(m) is preferably a first-order all-pole window function of length $N_w$, and $$S_S(w) = \sum_{l=0}^{N_w-1} w(l)s(N-l)$$

is calculated off line for each connection, and $$S_W = \sum_{l=0}^{N_w-1} w(l)$$

which is a constant. At the correct timing, the preceding equation provides the correct carrier error $f_C$. It will be appreciated that, alternatively, other window functions can be substituted for the first-order all-pole window function.

The total energy of the predetermined synchronization signal is calculated off line for each connection as $$E_S = \sum_{m=1}^{N} s^2(m)$$

The variance of the received signal is calculated on line as $$V_X(n) = \sum_{j=1}^{M_v} \left( x(n-j) - \frac{1}{M_v} \sum_{k=1}^{M_v} x(n-k) \right)^2$$

$$= \sum_{j=1}^{M_v} x^2(n-j) - \frac{1}{M_v} \left[ \sum_{j=1}^{M_v} x(n-j) \right]^2$$

In the detection logic, several additional adjustments and comparisons are made. First, the variance of the received signal is not allowed to be less than the product of the total energy of the synchronization signal and a predetermined flooring threshold.

If $V_x(n) < E_s$ThresholdII, $V_x(n) = E_s$ThresholdII

This is done to prevent an abnormally large metric when the noise is very low. The adaptive threshold for the current sample also preferably is calculated as the product of the total energy, the variance, and a predetermined constant. The numerator of equation (1) will then be compared with the adaptive threshold. (This is the same as comparing equation (1) with the predetermined constant alone, and is done to replace the division with a multiplication, thereby reducing processing.)

$Ad$Threshold$(n) = E_s V_x(n)$TresholdI

The values chosen for ThresholdI and ThresholdII depend upon the specific implementation and are determined empirically. The detection process is as follows.

First, the non-squared detection metric is calculated.

$M1 = R_{SX}(n-N+1) - \hat{f}C(n)S_s$ if M1<0

M1=0;

end

The latest three values of M1 are held in a shift register for evaluation.

$M1(1) \leftarrow M1(2) \leftarrow M1(3) \leftarrow M1$

The detection metric is also calculated $M2 = M1^2(2)$

The decision is made that received signal includes the predetermined synchronization signal and that the peak of the cross-correlation has been located when $M2 > Ad$Threshold $\& M1(2) > M1(1) \& M1(2) \geq M1(3)$ By performing the detection of the predetermined synchronization as disclosed above, the present invention advantageously removes the effects of carrier error, noise, and energy variation among the plurality of possible synchronization signals.

Figure 5:
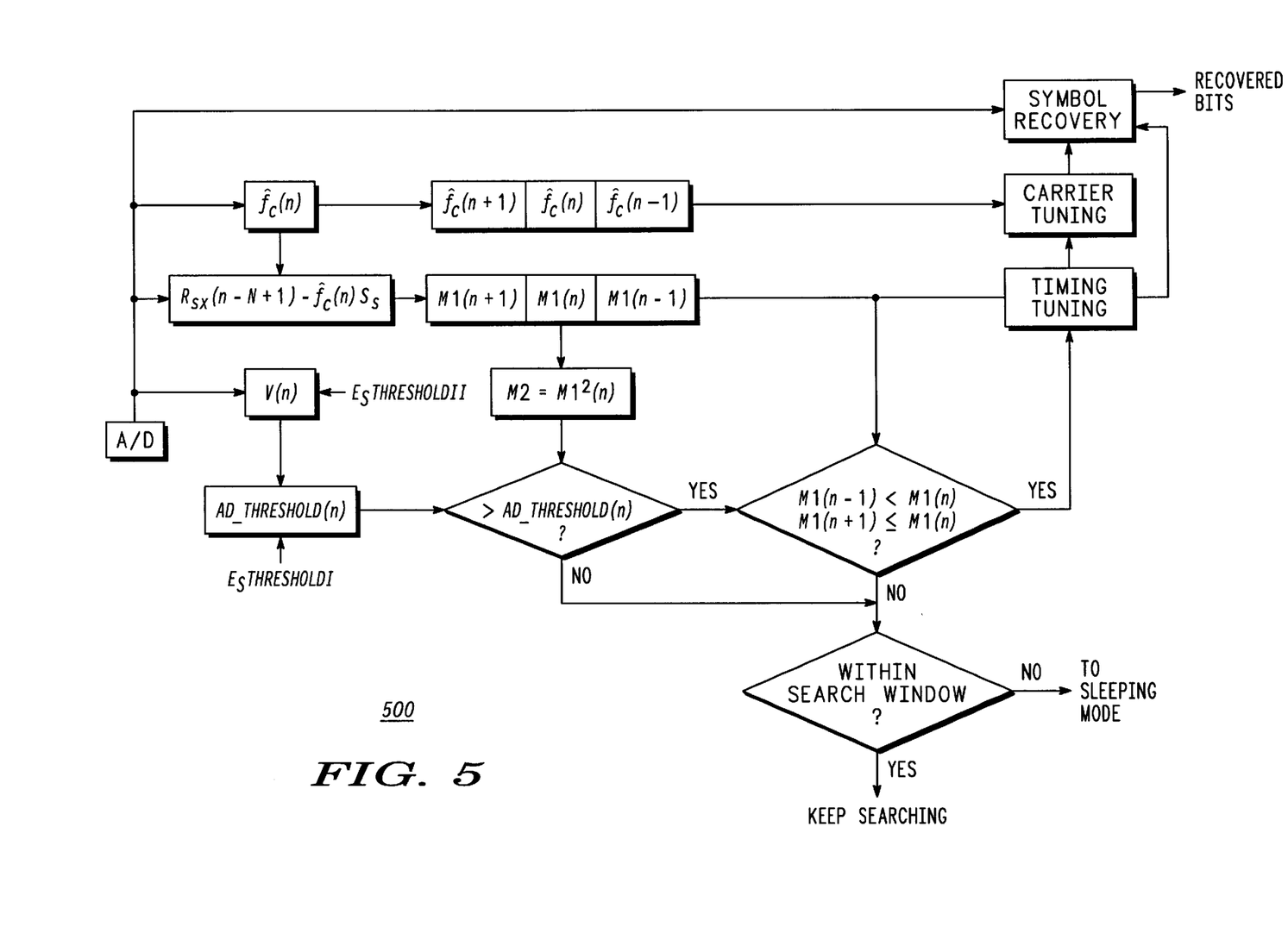
FIG. 5 is a flow diagram depicting a detection process in accordance with the present invention.

The timing and carrier error estimation are made after the predetermined synchronization signal has been detected and the cross-correlation peak has been located. Preferably, a second order polynomial peak of {M1(1), M1(2), M1(3)} is used as the fine tuned correlation peak to determine the fine tuned timing, and that timing is used to determine the fine tuned carrier error estimate by linear interpolation of the carrier error estimates calculated for the sample indexes immediately before and after the location of the fine tuned correlation peak. FIG. 5 is a flow diagram 500 depicting the detection process described above in accordance with the present invention. The flow diagram 500 is believed to be self-explanatory in view of the above discussion.

Equation (1), if calculated in a straightforward manner, would require substantial memory and processing power. It is thus desirable to transform the elements of equation (1) in a manner that will reduce the memory and processing requirements. We will begin the efficient calculation of the cross-correlation $$R_{SX}(n) = \sum_{m=1}^{N} x(m+n)s(m)$$

In one embodiment, the symbol rate is 1 million symbols per second. The synchronization signal includes 64 symbols $$\alpha_k = \pm 1$$

and there are 4 samples per symbol. In the cross-correlation equation above, N is then 256. A straightforward calculation of the cross-correlation would thus require 256×2=512 memory locations, and further would require 256 multiplications and 256 additions 0.25 microsecond. This is equivalent to 1024 million instructions per second (MIPS).

As received, each symbol pulse stretches over about 12 samples. The synchronization signal can be represented as $$s(m) = \sum_{k=1}^{64} \alpha_k g_s(m-4k)$$

where $g_s$ represents the symbol pulse. Substituting the right side of the above equation into the cross-correlation equation and simplifying the equation with the intent of reducing the memory and processing requirements produces the following transformation.

$$R_{SX}(n) = \sum_{m} x(m+n)s(m)$$
$$= \sum_{m} x(m+n) \sum_{k=1}^{64} \alpha_k g_s(m-4k)$$
$$= \sum_{k=1}^{64} \alpha_k R_{GX}(n+4k)$$

where $$R_{GX}(n) = \sum_{m=-6}^{6} g_s(m)x(n+m)$$
$$= \sum_{m=1}^{6} g_s(m)[x(n+m) + x(n-m)]$$

This transformation advantageously reduces the memory requirements to 253+12=265 locations, and substantially reduces the calculations to 6 multiplications and 6+5+64=75 additions—about a 95% saving in calculations. In addition, the complexity of the 6 multiplications is equivalent to the complexity of 3 of the multiplications of the straightforward approach, because the $g_s(m)$ values are known and can be built into the multipliers. Also, the generation of s(m), m=1, 2, . . . , 256 from $\alpha_k$, k=1, 2, . . . , 64 is avoided. The significant reduction in calculations advantageously translates directly into power reduction, which can be especially important in a portable wireless transceiver, for example.

Figure 6:
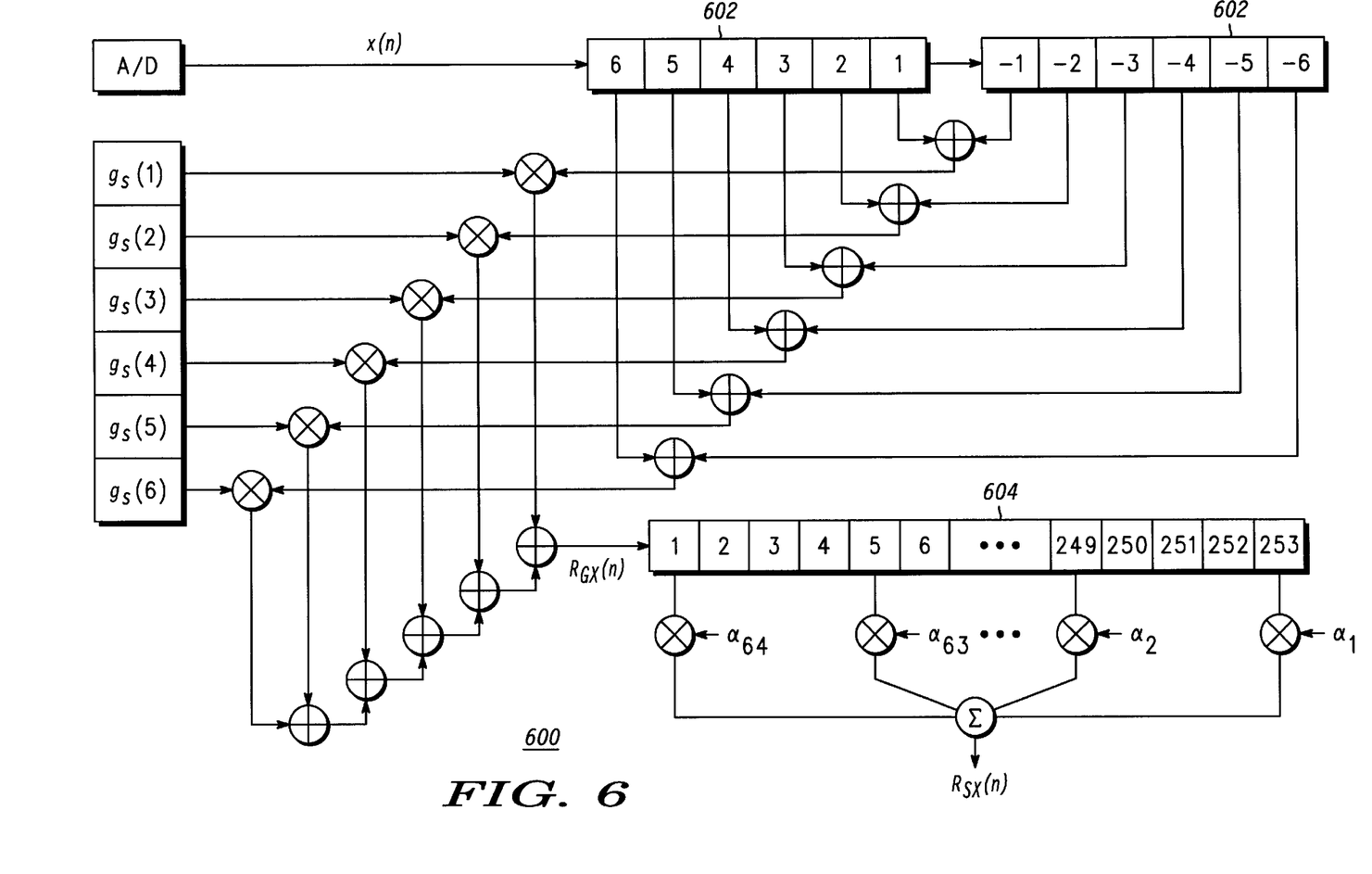
FIG. 6 is a flow diagram depicting the calculation of a cross-correlation $R_{sx}(n)$ in accordance with the present invention.

FIG. 6 is a flow diagram 600 depicting the calculation of the cross-correlation $R_{SX}(n)$ in accordance with the present invention. A first shift register 602 receives each sample of the received signal x(n). The twelve positions of the first shift register 102 are tapped and the values therein combined with the six values of $g_s(n)$ in six multipliers and 11 adders to generate $R_{GX}(n)$. A second shift register 604 receives each sample of $R_{GX}(n)$ and is tapped at every fourth position to generate $R_{SX}(n)$. Note that, because the $\alpha_k$ values are ±1, the 64 multipliers associated therewith are realized quite simply, as they only change the sign of the value received from the shift register 604.

Another value that must be calculated is the sum of the synchronization symbols.

$$S_S = \sum_{m=1}^{N} s(m)$$

The sync symbols are represented by $$s(m) = \sum_{k=1}^{64} \alpha_k g_s(m-4k), \; \alpha_k = \pm 1$$

where $g_s(m)$ is the known symbol pulse, which is preferably normalized such that $$\sum_m g_s(m) = 2$$

which results in $$S_S = \sum_{m=1}^{N} s(m) = \sum_{m=1}^{N} \sum_{k=1}^{64} \alpha_k g_s(m-4k) = \sum_m g_s(m) \sum_{k=1}^{64} \alpha_k$$
$$S_S = 2 \sum_{k=1}^{64} \alpha_k$$

$S_s$ is thus calculated as 2 x an even integer, which is easy. Furthermore, the result is 4× an integer, which simplifies calculations which use $S_s$. The calculation of $$s(m) = \sum_{k=1}^{64} \alpha_k g_s(m-4k), \; m = 1, 2, \ldots, 256$$

is advantageously avoided.

Another value which must be calculated is $$S_X(n) = \sum_{l=0}^{N_w-1} w(l)x(n-l)$$

Using the first-order all-pole window $$w(l) = \beta^l, \text{ with } \beta = 1 - \frac{1}{64}$$

$$S_X(n) = \beta S_X(n-1) + x(n), \text{ and}$$

$$\beta S_X(n-1) = S_X(n-1) - \frac{S_X(n-1)}{64}$$

Figure 7:
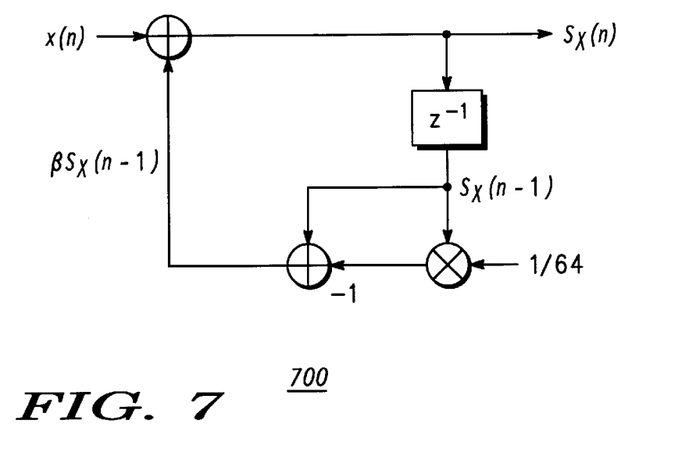
FIG. 7 is a diagram depicting the calculation of $S_S(n)$ in accordance with the present invention.

Thus updating $S_S(n)$ requires only two additions, since $$\frac{S_X(n-1)}{64}$$

costs no computation. FIG. 7 is a diagram 700 depicting the calculation of $S_S(n)$ in accordance with the above technique. It will be appreciated that, alternatively, a higher-order all-pole window (e.g., second-order, third-order) can be utilized instead of the first-order all-pole window.

A straightforward calculation of $S_S(n)$ would use a shift register of length $N_w$, e.g., 256, samples and a rectangular window $w(l)$. This would require two additions and shifting $N_w$ samples each sampling interval. The advantageous savings of performing the calculation in accordance with FIG. 7 are thus the elimination of circuitry for the shift register of length $N_w$ and the saving of power for the shifting.

Yet another value which must be calculated efficiently is $$S_S(w) = \sum_{l=0}^{N_w-1} w(l)s(N-l)$$

$$s(m) = \sum_{k=1}^{64} \alpha_k g_s(m-4k),$$

where $\alpha_k = \pm 1$ are the sync symbols and $g_s(m)$ is the symbol pulse.

$$S_S(w) = \sum_{l=0}^{N_w-1} w(l) \sum_{k=1}^{64} \alpha_k g_s(N-l-4k)$$

$$= \sum_{k=1}^{64} \alpha_k \sum_{l=0}^{N_w-1} w(l)g_s(N-l-4k)$$

$$= \sum_{k=1}^{64} \alpha_k G_w(k) \text{ where } G_w(k) = \sum_{l=0}^{N_w-1} w(l)g_s(N-l-4k)$$

When using the first-order all-pole window $$w(l) = \beta^l, \text{ with } \beta = 1 - \frac{1}{64}$$

for this calculation, $G_w(k)$ can either be saved in memory for use when needed, or can be calculated when needed. This advantageously makes possible a trade-off between calculation and memory usage.

Still another value to be calculated is the variance of the received signal.

$$V_X(n) = \sum_{j=1}^{M_v} x^2(n-j) - \frac{1}{M_v}\left[\sum_{j=1}^{M_v} x(n-j)\right]^2$$

To save memory, $V_x(n)$ is updated every U samples, e.g., every 65 samples, instead of every sample. This is preferably done by recursively calculating the following values during a 64-sample interval $$E_X = \sum_{n=1}^{64} x^2(n), \text{ and } A_X = \sum_{n=1}^{64} \frac{x(n)}{8}$$

(Note that x(n)/8 costs no computation.) On the (U+1)th sample, e.g., the 65th sample, $E_X$ and $A_X$ are shifted into two shift registers each preferably containing two earlier calculated values of $E_X$ and $A_X$.

$$E_X \rightarrow E_X(1) \rightarrow E_X(2) \rightarrow E_X(3) \text{ and } A_X \rightarrow A_X(1) \rightarrow A_X(2) \rightarrow A_X(3)$$

Next, The variance is then preferably estimated from the three values of $E_X$ and $A_X$ in the two shift registers.

$$V_x = 3[E_X(1)+E_X(2)+E_X(3)] - [A_X(1)+A_X(2)+A_X(3)]^2$$

and if $V_x < E_s$ThresholdII, then $V_x = E_s$ThresholdII

It will be appreciated that, alternatively, more or fewer values of $E_X$ and $A_X$ can be computed and stored in the two shift registers, depending upon resolution requirements of the variance.

Figure 8:
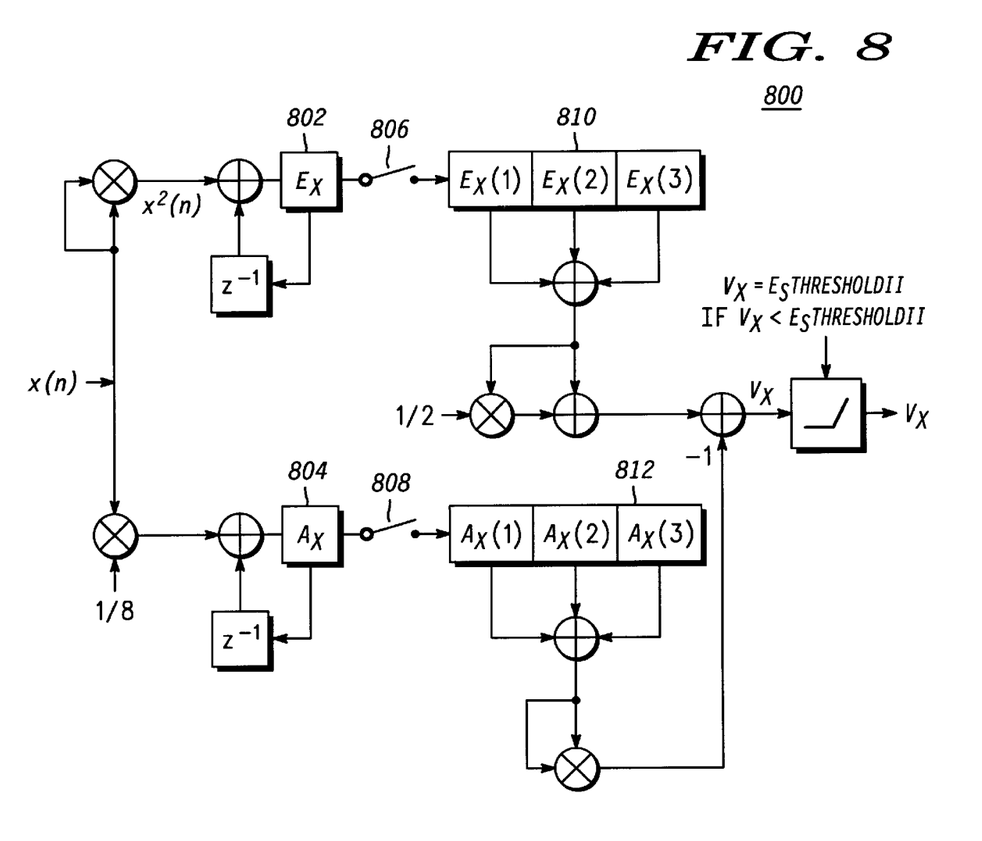
FIG. 8 is a diagram depicting the calculation of the variance of the received signal in accordance with the present invention.

FIG. 8 is a diagram 800 depicting the calculation of the variance in accordance with the above preferred technique. Note that in the embodiment depicted in the diagram 800, every U samples the switches 806, 808 are closed to allow the new values of $E_X$ and $A_X$ to move into the shift registers 810, 812, after which the accumulators 802, 804 are cleared. Advantageously, this recursive calculation technique substantially reduces the amount of multiplications required to estimate $V_x$.

Yet another value which should be calculated efficiently is the sync signal energy $$E_S = \sum_{n=1}^{N} s^2(n)$$

Again, the sync signal is represented by $$s(n) = \sum_{k=1}^{64} \alpha_k g_s(n-4k)$$

where $\alpha_k = \pm 1$ are the sync symbols and $g_s(m)$ is the symbol pulse.

$$E_S = \sum_n s^2(n) = \sum_n \left[\sum_{k=1}^{64} \alpha_k g_s(n-4k)\right]^2 = \sum_{k=1}^{64} \sum_{l=1}^{64} \alpha_k \alpha_l E_G(k-l)$$

$$\approx \sum_{k=1}^{64} \alpha_k^2 E_G(0) + 2\left[\sum_{k=1}^{63} \alpha_k \alpha_{k+1}\right] E_G(1) + 2\left[\sum_{k=1}^{62} \alpha_k \alpha_{k+2}\right] E_G(2)$$

$$= 64 E_G(0) + 2\left[\sum_{k=1}^{63} \alpha_k \alpha_{k+1}\right] E_G(1) + 2\left[\sum_{k=1}^{62} \alpha_k \alpha_{k+2}\right] E_G(2)$$

where $$E_G(k) = \sum_{n=-6}^{6} g_s(n)g_s(n-4k)$$

and $\{E_G(0), E_G(1), E_G(2)\}$
are constants, and $$\sum_{k=1}^{63} \alpha_k \alpha_{k+1}$$

and $$\sum_{k=1}^{62} \alpha_k \alpha_{k+2}$$

are integers. This calculation advantageously avoids the calculation of s(n) from the symbol pulse $g_s(m)$, and the memory to store s(n). In addition, the calculation replaces the multiplication of $s^2(n)$ with simple additions.

It should be clear from the preceding disclosure that the present invention provides a method and apparatus in a wireless communication system for facilitating detection of, and synchronization with, a predetermined synchronization signal selected from a plurality of different synchronization signals. Advantageously, the method and apparatus operates reliably with synchronization signals having a wide range of energy levels and does not false on noise or on unwanted synchronization codes.

Many modifications and variations of the present invention are possible in light of the above teachings. Thus, it is to be understood that, within the scope of the appended claims, the invention can be practiced other than as specifically described herein above.

What is claimed is:

1. A method in a wireless communication system for facilitating detection of, and synchronization with, a predetermined synchronization signal selected from a plurality of different synchronization signals, the method comprising the steps of:
    calculating a total energy of said predetermined synchronization signal;
    receiving a signal which may include the predetermined synchronization signal;
    calculating a plurality of cross-correlation values between the received signal and said predetermined synchronization signal to locate a correlation peak;
    calculating a plurality of detection metrics as a function of said plurality of cross-correlation values, the received signal, and said predetermined synchronization signal;
    calculating a corresponding plurality of adaptive thresholds as a function of said total energy and said received signal; and
    comparing said plurality of detection metrics with said plurality of adaptive thresholds to determine whether said received signal includes said predetermined synchronization signal.

2. The method of claim 1, wherein the step of calculating said plurality of detection metrics comprises the steps of:
    calculating from the received signal a corresponding plurality of carrier error estimates;
    calculating a sum of samples of said predetermined synchronization signal;
    multiplying said plurality of carrier error estimates by said sum to produce a plurality of adjustment values;
    adjusting said plurality of cross-correlation values by said plurality of adjustment values, thereby producing a plurality of non-squared detection metrics; and
    squaring said plurality of non-squared detection metrics to generate said plurality of detection metrics.

3. The method of claim 1, wherein the step of calculating said plurality of adaptive thresholds comprises the steps of:
    calculating a plurality of variances of said received signal; and
    multiplying said plurality of variances by said total energy and by a threshold constant.

4. The method of claim 1, wherein said comparing step comprises the steps of:
    comparing a detection metric of said plurality of detection metrics with a corresponding adaptive threshold of said plurality of adaptive thresholds to determine whether said detection metric is greater than said corresponding adaptive threshold; and
    when said detection metric is greater than said corresponding adaptive threshold:
        determining that said received signal includes said predetermined synchronization signal; and
        locating a peak non-squared detection metric that is greater than non-squared detection metrics one sample index earlier and later than the sample index of said peak non-squared detection metric.

5. The method of claim 4, further comprising, in response to locating said peak non-squared detection metric, the step of
    determining a location of a fine tuned correlation peak from said peak non-squared detection metric and said non-squared detection metrics one sample index earlier and later than the sample index of said peak non-squared detection metric.

6. The method of claim 5, further comprising the step of determining a final carrier error estimate from said location of said fine tuned correlation peak.

7. The method of claim 5, further comprising the step of deriving a symbol timing from said location of said fine tuned correlation peak.

8. A transceiver in a wireless communication system for facilitating detection of, and synchronization with, a predetermined synchronization signal selected from a plurality of different synchronization signals, the transceiver comprising:
    a receiver front end for receiving and demodulating a signal which may include the predetermined synchronization signal;
    a transmitter for sending a communication; and
    a processor coupled to the receiver front end for processing the received signal and coupled to the transmitter for controlling the transmitter, wherein the processor is programmed to:
        calculate a total energy of said predetermined synchronization signal;
        calculate a plurality of cross-correlation values between the received signal and said predetermined synchronization signal to locate a correlation peak;
        calculate a plurality of detection metrics as a function of said plurality of cross-correlation values, the received signal, and said predetermined synchronization signal;

calculate a corresponding plurality of adaptive thresholds as a function of said total energy and said received signal; and compare said plurality of detection metrics with said plurality of adaptive thresholds to determine whether said received signal includes said predetermined synchronization signal.

9. The transceiver of claim 8, wherein the processor is further programmed to:

calculate from the received signal a corresponding plurality of carrier error estimates;

calculate a sum of samples of said predetermined synchronization signal;

multiply said plurality of carrier error estimates by said sum to produce a plurality of adjustment values;

adjust said plurality of cross-correlation values by said plurality of adjustment values, thereby producing a plurality of non-squared detection metrics; and square said plurality of non-squared detection metrics to generate said plurality of detection metrics.

10. The transceiver of claim 8, wherein the processor is further programmed to:

calculate a plurality of variances of said received signal; and multiply said plurality of variances by said total energy and by a threshold constant.

11. The transceiver of claim 8, wherein the processor is further programmed to:

compare a detection metric of said plurality of detection metrics with a corresponding adaptive threshold of said plurality of adaptive thresholds to determine whether said detection metric is greater than said corresponding adaptive threshold; and when said detection metric is greater than said corresponding adaptive threshold:

determine that said received signal includes said predetermined synchronization signal; and locate a peak non-squared detection metric that is greater than non-squared detection metrics one sample index earlier and later than the sample index of said peak non-squared detection metric.

12. The transceiver of claim 11, wherein the processor is further programmed, in response to locating said peak non-squared detection metric, to determine a location of a fine tuned correlation peak from said peak non-squared detection metric and said non-squared detection metrics one sample index earlier and later than the sample index of said peak non-squared detection metric.

13. The transceiver of claim 12, wherein the processor is further programmed to determine a final carrier error estimate from said location of said fine tuned correlation peak.

14. The transceiver of claim 12, wherein the processor is further programmed to derive a symbol timing from said location of said fine tuned correlation peak.

15. An apparatus for use with a receiver front end that receives and demodulates a signal which may include a predetermined synchronization signal selected from a plurality of different synchronization signals, the apparatus for facilitating detection of, and synchronization with, the predetermined synchronization signal, the apparatus comprising:

a processor coupled to the receiver front end for processing the received signal, wherein the processor is programmed to:

calculate a total energy of said predetermined synchronization signal;

calculate a plurality of cross-correlation values between the received signal and said predetermined synchronization signal to locate a correlation peak;

calculate a plurality of detection metrics as a function of said plurality of cross-correlation values, the received signal, and said predetermined synchronization signal;

calculate a corresponding plurality of adaptive thresholds as a function of said total energy and said received signal; and compare said plurality of detection metrics with said plurality of adaptive thresholds to determine whether said received signal includes said predetermined synchronization signal.

16. The apparatus of claim 15, wherein the processor is further programmed to:

calculate from the received signal a corresponding plurality of carrier error estimates;

calculate a sum of samples of said predetermined synchronization signal;

multiply said plurality of carrier error estimates by said sum to produce a plurality of adjustment values;

adjust said plurality of cross-correlation values by said plurality of adjustment values, thereby producing a plurality of non-squared detection metrics; and square said plurality of non-squared detection metrics to generate said plurality of detection metrics.

17. The apparatus of claim 15, wherein the processor is further programmed to:

calculate a plurality of variances of said received signal; and multiply said plurality of variances by said total energy and by a threshold constant.

18. The apparatus of claim 15, wherein the processor is further programmed to:

compare a detection metric of said plurality of detection metrics with a corresponding adaptive threshold of said plurality of adaptive thresholds to determine whether said detection metric is greater than said corresponding adaptive threshold; and when said detection metric is greater than said corresponding adaptive threshold:

determine that said received signal includes said predetermined synchronization signal; and locate a peak non-squared detection metric that is greater than non-squared detection metrics one sample index earlier and later than the sample index of said peak non-squared detection metric.

19. The apparatus of claim 18, wherein the processor is further programmed, in response to locating said peak non-squared detection metric, to determine a location of a fine tuned correlation peak from said peak non-squared detection metric and said non-squared detection metrics one sample index earlier and later than the sample index of said peak non-squared detection metric.

20. The apparatus of claim 19, wherein the processor is further programmed to determine a final carrier error estimate from said location of said fine tuned correlation peak.

21. The apparatus of claim 19, wherein the processor is further programmed to derive a symbol timing from said location of said fine tuned correlation peak.

* * * * *